C. P. BRUMBY.
AUTOMATIC SACKING AND WEIGHING MACHINE.
APPLICATION FILED APR. 22, 1913.

1,105,752.

Patented Aug. 4, 1914.
5 SHEETS—SHEET 5.

Witnesses
C. R. Bealle.
C. P. Landow.

Inventor
C. P. Brumby.
By
Attorney

UNITED STATES PATENT OFFICE.

CLARENCE P. BRUMBY, OF EAST POINT, GEORGIA.

AUTOMATIC SACKING AND WEIGHING MACHINE.

1,105,752.   Specification of Letters Patent.   Patented Aug. 4, 1914.

Application filed April 22, 1913. Serial No. 762,946.

*To all whom it may concern:*

Be it known that I, CLARENCE P. BRUMBY, a citizen of the United States, residing at East Point, in the county of Fulton and State of Georgia, have invented certain new and useful Improvements in Automatic Sacking and Weighing Machines; and I do hereby declare the following to be a full, clear, and exact description of the invention, such as will enable others skilled in the art to which it appertains to make and use the same.

This invention relates to automatic weighing machines, and has particular reference to machines of this character which are designed especially for the weighing of grain and similar substances and materials in the bulk.

As its principal object, therefore, this invention aims to provide a machine in which the sacking and weighing operations are coincident and are automatically controlled by novel features of construction, introduced in the machine.

This invention also contemplates the construction of an automatic weighing and sacking machine in which means are provided for automatically cutting off the supply of material from the sack when the weight of the material discharged into the sack has reached a predetermined point.

A further object of this invention resides in the provision of means coacting with the material discharging apparatus for automatically reducing the volume of material issuing into the sack, when the weight of the grain contained within the sack has closely approached the desired final weight unit.

A still further object is to provide a machine in which the weighing and sacking operations will be continuous and uninterrupted and in which means are provided for bringing an empty sack into registration with the discharging element simultaneously with the completion of the filling of the preceding sack.

A yet further object is to prevent a waste of grain when shifting the discharge from the filled to an empty sack, by reducing the material discharge to a minimum immediately previous to the substitution of an empty for a filled sack.

A still further object is to provide means automatically controlled by the weight of the grain contained within the receiving sack for decreasing the volume of the material discharge when the receiving sack has been filled with a bulk of grain approximately equivalent in weight to nine-tenths the weight of the desired final unit.

A yet further object is to provide means automatically controlled by the weight of the grain contained within the receiving sack for increasing the grain discharge to a maximum volume simultaneously with the complete attainment of the desired weight unit in the receiving sack.

This invention further aims to provide means for disposing an empty sack in position to receive the maximum material discharge when the preceding sack has been completely filled.

A further object resides in the provision of means automatically controlled by the weight of the grain in the receiving sack and adapted to be actuated upon the completion of the filling of a receiving sack for automatically reversing the direction of the discharging material from the filled sack to an empty substitute sack.

An object of equal importance with the foregoing is to provide means for adjusting the machine to automatically and simultaneously sack and weigh grain or other material in any predetermined units.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts.

Proceeding now to the description of the drawings, the various coacting features of construction of the machine may be classified as follows: (1) The supporting frame; (2) the hopper and discharge rotor; (3) the sack holders; (4) the discharge controlling mechanism; and (5) the reversing mechanism.

*Supporting frame.*—Taking up as first in order the description of the main supporting frame, this feature of the invention may be of any conventional and suitable type, but the preferred structure employed includes a pair of upper longitudinal beams 10 and 11 and lower longitudinal beams 12 and 13. These longitudinal beams are preferably made of angle iron and may be supported by any desired type of supporting legs of similar structure, which are not included in the drawings, inasmuch as they would only tend to complicate the disclosures. Secured to the beams 11 and 13 is a side plate 14, similar in construction to the side plate 15, carried by the beams 10 and 12. The members 10 and 12 may be connected at their terminals by cross beams 16 and 17.

*Hopper and discharge rotor.*—Coming now to the description of the hopper and discharge rotor, this feature of the invention includes a hopper 18 of the customary pyramid or cone shape, carrying adjacent its lower terminal the spaced laterally extending side flanges 19 and 20. The flanges 19 and 20 of each side of the hopper may be connected by a reinforcing rib 21, if so desired. Mounted for rotation within the hopper 18 is a paddle agitator 22, keyed on the main drive 23 which is journaled in bearing blocks 24 and 25, carried on the flanges 20. This agitator 22 of course acts to stir the grain within the hopper and prevent its clogging in the reduced exit terminal.

Figure 3:
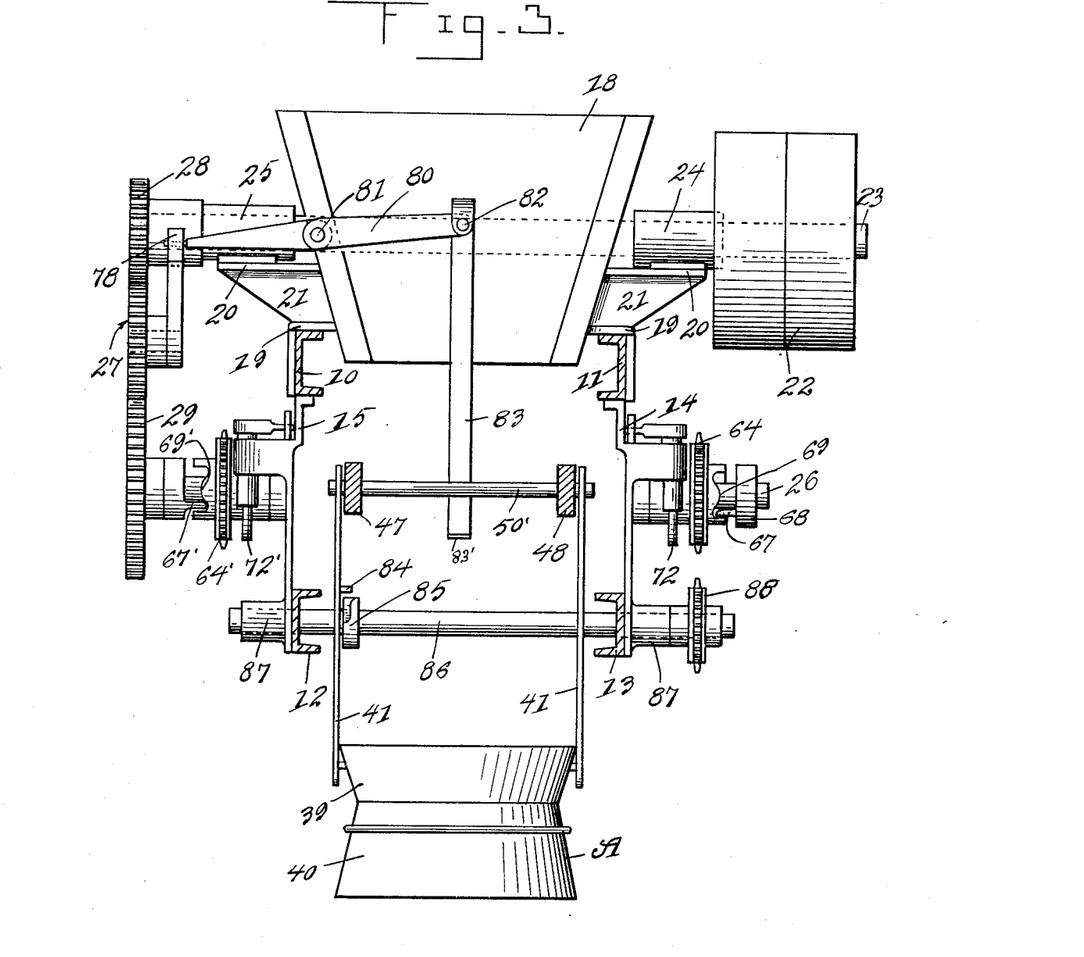
Fig. 3 is a section on the line 3—3 of Fig. 2.
Figure 4:
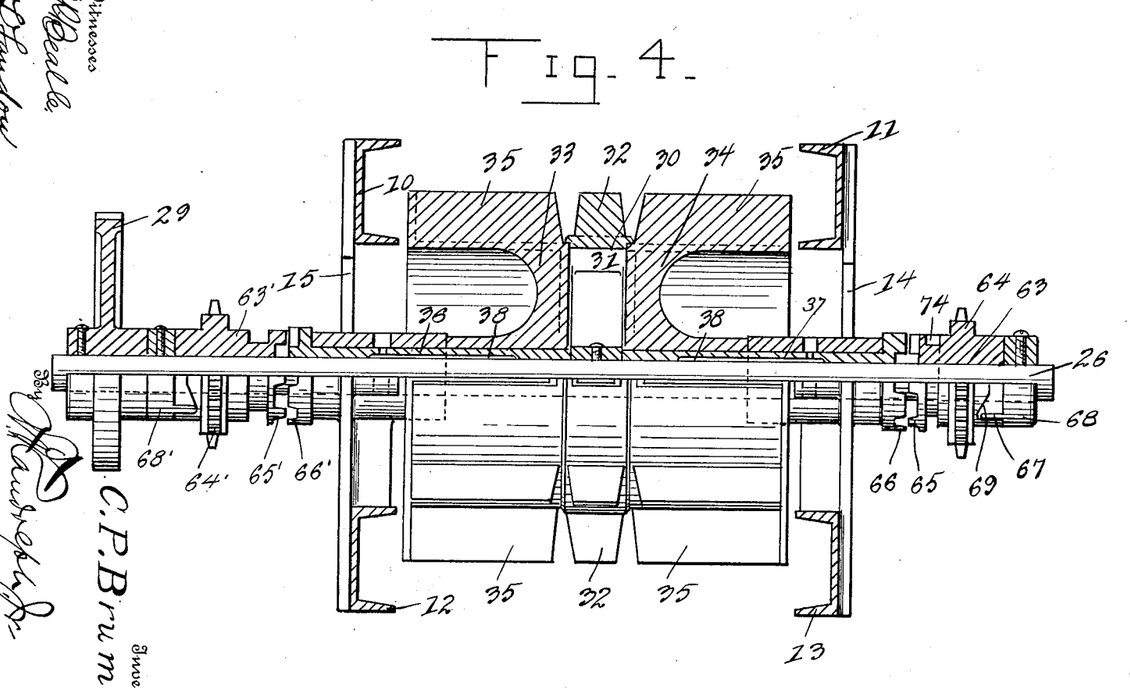
Fig. 4 is a section on the line 4—4 of Fig. 2.
Figure 5:
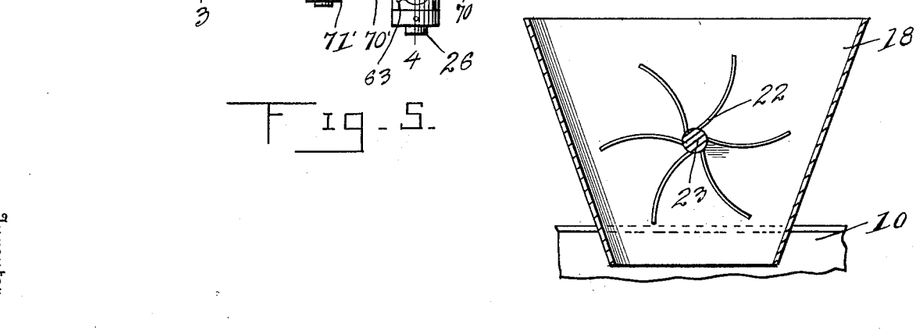
Fig. 5 is a vertical section through the hopper illustrated in Fig. 1.
Figure 6:
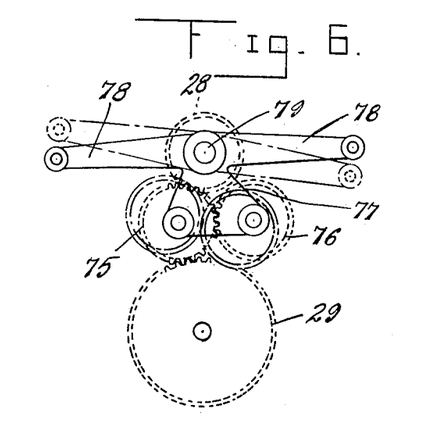
Fig. 6 is a detail view of the reverse gearing employed in reversing the direction of rotation of the discharging drum.

The discharge rotor of this invention is arranged to receive the material as it issues from the hopper and to carry it to the receiving sack. The specific features of construction of the discharge rotor include a horizontal shaft 26, journaled in the side plates 14 and 15 and positively driven through a reversible gear connection, designated as an entirety by the numeral 27 in Fig. 3, which is introduced between the gear wheel 28, carried terminally of the shaft 23, and the gear wheel 29, carried terminally of the shaft 26. Keyed on the shaft 26 and approximately midway between the two side plates 14 and 15 is a center rotor section 30 which consists essentially in a wheel or disk 31, equipped with circumferentially spaced radially extending plates or vanes 32. On each side of the center section 30 of the rotor are arranged the terminal sections 33 and 34, equipped with vanes 35, similar to the members 32 and fixed on the loose sleeves 36 and 37, illustrated in detail in Fig. 4. The sleeves 36 and 37 are loosely journaled on the shaft 26 and may be formed with oil bores 38 for an obvious purpose. It will be observed from the foregoing that the center section 30 of the rotor rotates at all times with the shaft 26, while the sections 33 and 34 are loosely journaled on the shaft 16 and must be actuated through some other driving means. The actuating mechanism employed in rotating the members 33 and 34 will be hereinafter more fully described under the section devoted to discharge controlling mechanism.

*Sack holders.*—Having thus described the discharge rotor, the next features of construction to be disclosed are the sack holders, which are arranged to receive from the rotor the grain or other material to be weighed and sacked.

Figure 1:
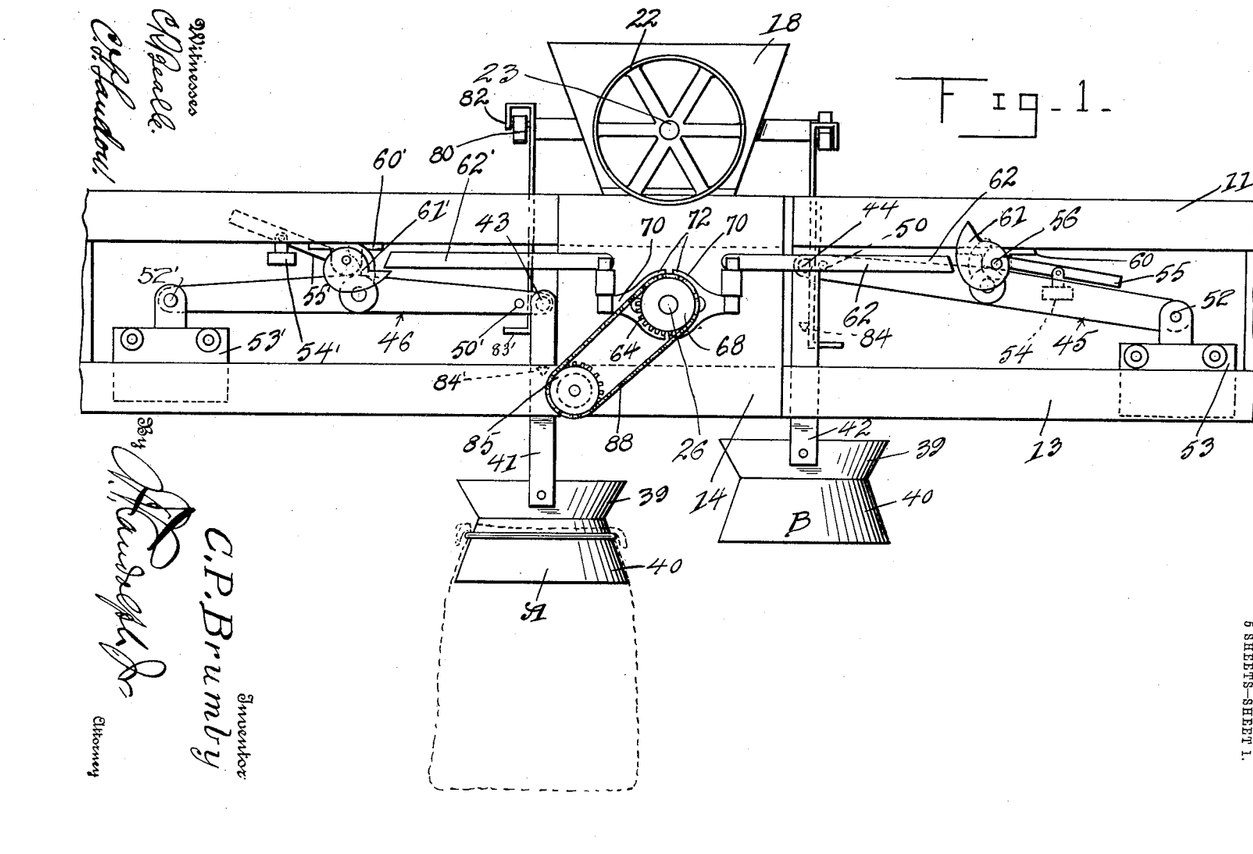
Figure 1 is a side elevation.
Figure 2:
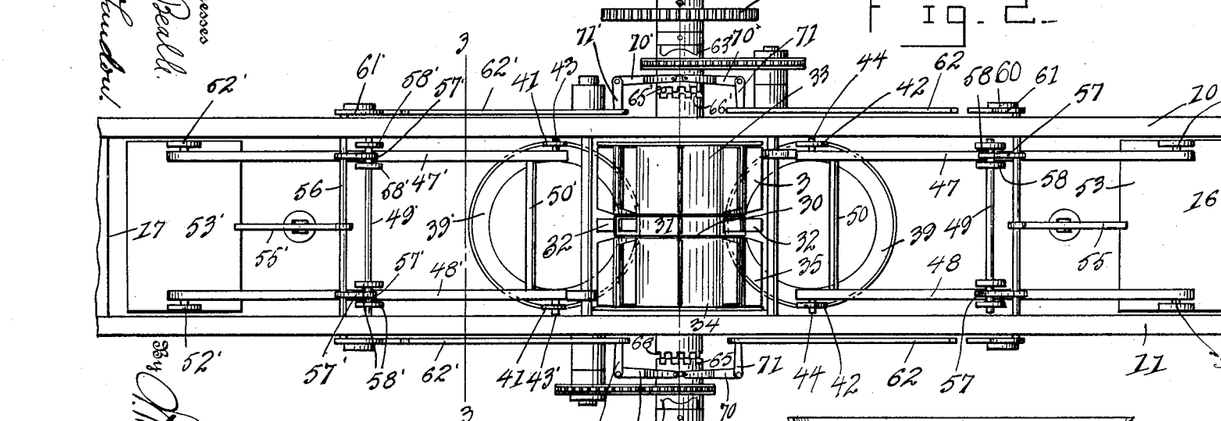
Fig. 2 is a top plan view.

The sack holders each includes a pair of frustoconical shells 39 and 40 superimposed one upon the other with apex portions contacting, as in Fig. 1. The sack holders are two in number, and are each secured to the lower terminals of pairs of vertical arms 41 and 42, and pivotally connected to and dependent from pairs of horizontal pintles 43 and 44, which are arranged on each side of the rotor in a manner to be hereinafter disclosed. It will be apparent from the foregoing description and by reference to Fig. 1 particularly, that the two sack holders which may be respectively designated as A and B are arranged to receive grain or other materials from the discharge rotor at opposite sides thereof.

*Discharge controlling mechanism.*—Taking up therefore as next in order the means employed in bringing the sack holders A and B successively into receiving relation to the rotor, this feature of the invention includes a pair of scale frames designated in Fig. 1 as entireties by the numerals 45 and 46. The two scale frames 45 and 46 and the structure associated therewith are similar in every detail and differ only in the fact that they operate alternately. It will therefore be necessary to describe the construction of only one of the scale frames, the member 45 being chosen in this instance. In the drawings all parts of the member 46 and mechanism associated therewith will be given the prime numeral of similar parts of the member 45 to be now described.

The member 45 includes a pair of lever arms 47 and 48, pivotally mounted in longitudinal extension to the longitudinal frame beams on a horizontal shaft 49. The members 47 and 48 are connected at their forward terminals by a lateral beam or rod 50, and are pivotally attached by pintles 44 to the upper terminals of the member 42, as previously described. The rear terminals of the members 47 and 48 are pivotally connected as at 52 to a weight box 53. The member 53 may be of any desired construction, the only requirement being that it be so formed that weights of various sizes may be readily placed in or taken out for a purpose to be hereinafter described.

Regarding the member 53 as the main poise or weight, there is provided a counterpoise 54, pivotally attached to a lever arm 55, keyed on a horizontal shaft 56, which is journaled between the side plates 14 and 15, and is mounted slightly above and to the rear of the shaft 49. As a means for operatively connecting the arm 55 to the members 47 and 48 and for permitting the movement of the arms 47 and 48 to be transmitted to the member 53, there is provided a pair of levers 57 keyed on the shaft 56, adjacent the terminals thereof, and mounted between a pair of segmental lever arms 58 arranged in pairs and keyed to the terminal portions of the shaft 59. The levers 57 extend at right angles to the shaft 56 and the member 53 lies in a horizontal plane corresponding to the position of the members 47 and 48. It will thus be seen that when the members 47 and 48 are swung upwardly into the position indicated by dotted lines in Fig. 8, the member 53 will be actuated through a corresponding arc. The purpose and function of this movement will be fully described in the portion to be later confined to the description of the operation of the machine. The shaft 56 is journaled in bearing plates 60 secured to the longitudinal beams 10 and 11, and is of such length that its terminals extend beyond the members 60. Each terminal of the shaft 56 carries a fixed cam 61 arranged to engage and impart a forward movement to slidably mounted push levers 62 mounted in suitable brackets on each longitudinal beam 10 and 11.

Interpolating now a brief description of the clutch mechanism which controls the actuation of the sleeve 37 each terminal of the shaft 26 is provided with a clutch mechanism adapted to control the rotation of the sleeves 36 and 37. However, inasmuch as the structure of each clutch is similar it will be necessary to describe the specific structure of only one. This feature includes a clutch sleeve 63 loosely mounted terminally of the shaft 26. The sleeve 63 carries an integrally formed circumferentially extending sprocket wheel 64, and is provided at one terminal with the clutch teeth 65, arranged to mesh with the clutch teeth 66 of the sleeve 37 when the clutch is thrown in. This clutch 63 is normally in operative relation to the members 65 engaging the members 66, being normally held in this position by the lateral lug 67 fixed on the collar 68 mounted terminally of the shaft 26. During the rotation of the shaft 26 the lug 67 after riding up the inclined cam face 69 of the member 63, throws the clutch in and holds it until the clutch release mechanism is applied.

Figures 7, 8:
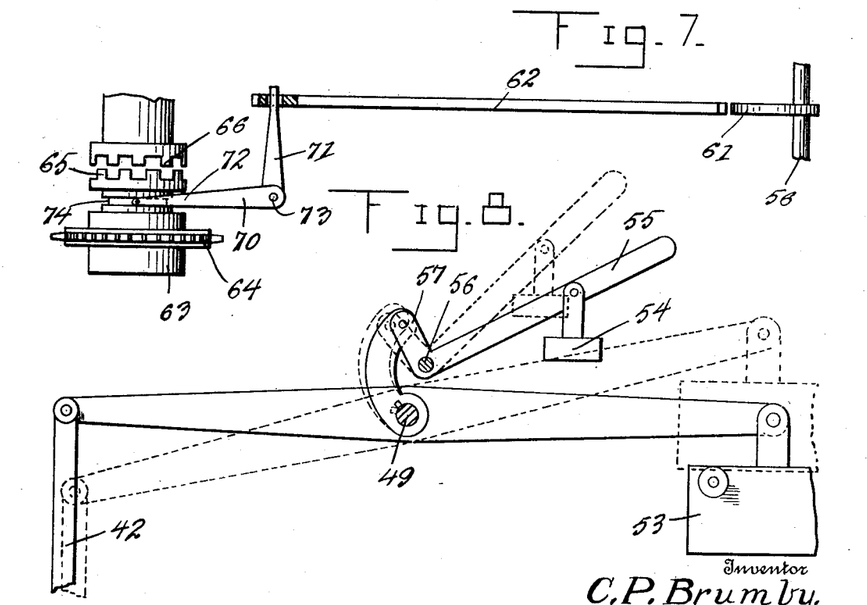
Fig. 7 is a detail view illustrating the clutch and shifting means therefor, employed in controlling the direction of rotation of the two larger rotors of the discharge drum.
Fig. 8 is an additional detail view of the clutch control for the large rotors illustrating in detail the means by which the weight of the grain in the receiving sack controls the shifting of the clutch.

Reverting now to the description of the clutch release it will be observed by reference to Fig. 7 that a bell crank lever, the horizontal arm of which is designated by the numeral 70 and the lateral arm of which is designated by the numeral 71, is formed with a terminal yoke 72, carried on the free end of the arm 70. The bell crank lever is pivotally mounted on the pivot pintle 73, and is arranged in such manner that the yoke terminal 72 rides in an annular groove 74 formed in the member 63. A clutch release of the type above described is pivotally connected to the terminal of each push lever 62 and 62'.

From the foregoing it will be apparent that when the cam 61 rotates in such position that it imparts a forward movement to the member 62, the arm 71 will swing on the pivot 73, with a consequent swinging of the arm 70. When the arm 70 swings during the forward movement of the lever 62, the clutch 63 will be moved along the shaft 23 out of engagement with the clutch terminal of the sleeve 37. A full description of the function of the shifting of this clutch with relation to the weighing and sacking of the sack will be fully described hereinafter.

*Reversing mechanism.*—The construction of the controlling mechanism for the discharge rotor being thus disclosed in detail, it now remains to describe the means employed in reversing the direction of rotation of the rotor shaft 26 and sleeve 37. This mechanism includes the set of reverse gears, designated as an entirety in Fig. 3 by the numeral 27, and the means controlled by the sack holder A for operating the reverse gearing. The set of reverse gears includes the gear wheels 75 and 76, journaled in a bearing plate 77, which is depended from a lever arm 78, mounted on the main drive shaft 23. This reverse gearing is only one type which may be used, and is the well known structure, and therefore not claimed as part of this invention. The operation of the direction of rotation of the gear wheels 28 and 29 above referred to is accomplished by swinging the lever 78 to throw the gear wheel 76 into engagement with the member 29, or by giving the lever 78 a reverse movement to bring the wheel 75 into engagement with the gear wheels 28 and 29. The lever 78 is operated by the lever 80, pivoted on a shaft 81, carried by the hopper and pivotally connected at its terminal as at 82 connected to a rod 83, the lower terminal of which carries a laterally extending lug 83' normally arranged a slight distance below the shaft 50', and adapted to be engaged thereby upon the downward movement of the sack supporting member 42. The member 41 carries an inwardly extending lateral lug 84, which is arranged for engagement by a cam 85, keyed on a shaft 86, which is journaled in the bearings 87 integral with the plates 14 and 15. The shaft 86 is operatively connected by a chain drive as at 88 to the member 64 of the clutch 66.

In passing from the description of the features of construction of this invention to the description of the operation, it is well to emphasize the fact that while this invention has been designed with particular reference to the weighing and sacking of grain, it may nevertheless be as readily employed in connection with the handling of any other dry material of like nature.

Proceeding now to the description of the operation of the machine, the grain is poured into the hopper 18 from the elevator or other conveyer and through the actuating of the main drive shaft 23, is urged through the bottom of the hopper by the agitator 22 and issues onto the rotor.

It is now to be presumed that the sack A has just been completely filled and that the sack B is in receiving position. As the shaft 23 is started the power will be transmitted to the shaft 26 through the gears 28, 27 and 29, reference being had in this connection to Fig. 3. As the shaft 26 rotates the lug 67 bearing against the inclined face of the member 63 will throw the clutch into engagement with the clutch terminal of the member 67. The clutch 63' will also be thrown into operative position with the sleeve 36 by the action of the lug 67'. It will thus be observed that the shaft 23 is rotating the center section 31 of the rotor and that the sleeves 36 and 37 are rotating in unison with the shaft 26, consequently rotating the members 33 and 34 with the member 31. As the grain pours onto the rotor from the hopper 18, it will be carried by the vanes 35 and 32 and deflected downwardly into the open mouths of the sack holder B.

The grain will continue to issue into the sack B and as the volume of grain deposited in the sack B grows, the effect of the weight 53 will become lessened and the frame 46 will be swung on its shaft 49. As the frame 46 continues to swing the counterpoise 54 will be drawn upwardly through the connecting levers 58 and 57. The various lever arms of the machine are so related that when the sack B contains approximately nine-tenths the amount of grain the operator desired to deposit in each sack the cams 61 which are rotated as the counterpoise 54 is lifted, will engage the levers 62, consequently swinging the bell crank lever arms 71 and throwing out the clutches 63 and 63' in the manner above described and illustrated in detail in Fig. 7. It will be apparent that when the clutches 63 and 63' are thrown out the sleeves 36 and 37 will cease to rotate with the result that the only portion of the rotor remaining in motion will be the center section 31. This center section 31 continues to rotate and deposit grain into the receptacle B and as the grain is deposited the sack B of course assumes a lower level. When the sack B is dropped to a sufficient level to permit the lug 84 to be engaged by the cam 85, the member 42 and consequently the shaft 43 is given a sudden downward movement resulting in the reversing of the train of gears 27 through the contact of the shaft 50 with the member 83, and resultant swinging of the lever 80 in the manner previously described in detail.

From the foregoing it will be observed that at the moment the receiving sack has been completely filled, the direction of rotation of the shaft 26 is reversed and the clutches 63 and 63' are again thrown into engagement with the clutch terminals of the sleeves 36 and 37 in the manner above described. The three sections 31, 33 and 34 of the rotor are therefore reversed as regards their direction of rotation, and the grain is directed into the sack A which has been drawn upwardly into receiving position by the effect of the weight 53'. While the sack A is being filled the sack may be removed from the sack holder B permitting the member B to be drawn upwardly into receiving position. As the amount of grain deposited in the sack A reaches the desired limit the various parts of the discharge rotor controlling mechanism and reversing mechanism will be operated in a manner in exact accordance with that above described through the medium of those parts of the drawings designated by the prime numerals.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to when required, without sacrificing any of the advantages of the invention, as defined in the appended claims.

What is claimed is:

1. An automatic weighing and sacking machine including a plurality of sack holders, a rotor for discharging the material into a sack, means for actuating said rotor, and means operatively connected to said rotor actuating means and automatically controlled by the predetermined weight of the material contained within the receiving sack for reversing the direction of rotation of the said discharge rotor.

2. An automatic weighing and sacking machine including a plurality of sack holders, a rotor for discharging material into a sack, said rotor including a small center section and a pair of larger terminal sections, means automatically controlled by a predetermined weight of material discharged into the receiving sack for selectively rotating the said rotor sections and for reversing the direction of rotation of said rotor sections.

3. An automatic weighing and sacking machine including a plurality of sack holders, a plurality of sacks carried thereby, a rotor adapted to discharge material into a sack, said rotor including a positively driven shaft, a center rotor section keyed on said shaft, a pair of terminal rotor sections loosely mounted on said shaft, and means controlled by a predetermined weight of material contained within the receiving sack for automatically and selectively controlling the rotation of said center and end sections and for automatically reversing the direction of rotation of said center and end sections when the material contained within the receiving sack has reached a predetermined weight.

4. An automatic weighing and sacking machine including a main supporting frame, a discharge rotor mounted therein, said rotor including a positively driven shaft, a center rotor section keyed thereon, a pair of terminal sections loosely mounted thereon, and means automatically controlled by the weight of the grain contained within the receiving sack for selectively controlling the actuating of said center and end sections and for reversing the direction of rotation of the said sections when the weight of the grain in the reversing sack has reached a predetermined point.

5. An automatic weighing and sacking machine including a main supporting frame, a discharge rotor mounted therein, a plurality of sack holders mounted in said frame, and means for automatically reducing the volume of material discharged from the said rotor to a predetermined minimum and for increasing it to a predetermined maximum when the weight of the grain in the receiving sack has reached predetermined points.

6. An automatic weighing and sacking machine including a main supporting frame, a rotor journaled therein, said rotor including a positively driven shaft, a fixed rotor section keyed thereon, a pair of terminal rotor sections loosely mounted thereon, a plurality of sack holders arranged in said frame and adapted to receive the material from the said discharge rotor, and automatic means for disconnecting the actuating means for said terminal rotor sections when the weight of the grain in the receiving sack has reached a predetermined point.

7. An automatic weighing and sacking machine including a main supporting frame, a discharge rotor journaled therein, a plurality of sack holders, a plurality of sacks for said holders adapted to receive the material from said discharge rotor, said rotor including a positively driven shaft, a central rotor section keyed on said shaft; a pair of terminal rotor sections loosely mounted on said shaft, and automatic means for reversing the direction of rotation of said center and end sections when the volume of material in the receiving sack has reached a predetermined weight.

8. An automatic weighing and sacking machine including a main supporting frame, a discharge rotor journaled therein, a plurality of sack holders, sacks for said holders, said sacks being adapted to receive the grain from said discharge rotors, and automatic means for successively reducing the material discharged in the said rotor to a predetermined minimum, reversing the direction of rotation of the rotor, and increasing the volume of discharge from the said rotor to a predetermined maximum when the bulk of grain in the receiving sack has reached predetermined points.

9. An automatic weighing and sacking machine including a pair of sack holders, sacks carried thereby, said sack holders being adapted to be alternately brought into receiving position, a rotor for discharging material into the receiving sack, and means automatically controlled for reversing the direction of rotation of the said rotor when the weight of the material contained within the receiving sack has reached a predetermined point.

10. An automatic weighing and sacking machine including a discharge rotor, a plurality of sack holders adapted to be successively disposed in receiving relation thereto, means automatically controlled by the weight of the material contained within the receiving sack for reducing the flow of material from the said rotor to a predetermined minimum when the weight of the material deposited within the receiving sack has reached a predetermined point.

11. An automatic weighing and sacking machine including a discharge rotor, a pair of sack holders, sacks detachably connected to said holders, said holders being adapted to be alternately brought into receiving relation to the said rotor, and means operatively connected to each of said sack holders and adapted to be operated by the immediate receiving sack for successively reducing the flow of material from the rotor to a predetermined minimum reversing the direction of rotation of the rotor and increasing it to a predetermined maximum when the weight of the material contained within the immediate receiving sack has reached a predetermined point.

12. An automatic weighing and sacking machine including a plurality of sack holders, means for discharging material into a sack, means for rotating said discharging means and means operatively connected with said last-named means and the sack holders and automatically controlled by the predetermined weight of the material contained within the receiving sack for reversing the direction of rotation of said discharging means.

13. An automatic weighing and sacking machine including a plurality of sack holders, means for discharging the material into a sack comprising a plurality of revoluble sections, means for operating the sections and automatic means operatively connected with the sack holders and the sections for reducing the material discharged from said discharging means to a predetermined minimum, reversing the direction of rotation of the sections and increasing the volume of discharge from the sections to a predetermined maximum operated by the weight of the grain in the receiving sack.

14. An automatic weighing and sacking machine including a supporting frame, a plurality of discharge sections rotatably mounted within the frame, means for rotating said sections, a plurality of sack holders, sacks for said holders, adapted to receive grain from the discharge sections, automatic means for permitting one of said rotatable sections to rotate and for holding the other of the sections against rotation and for reversing the direction of discharge from the receiving sack into an empty sack operated by the weight of the grain within the receiving sack.

15. An automatic weighing and sacking machine including a supporting frame, a discharge rotor journaled therein, a plurality of sack holders, a plurality of sacks for said holders adapted to receive the material from said discharge rotor, said rotor including a positively driven shaft, a central rotor section keyed on said shaft, a pair of terminal rotor sections loosely mounted on said shaft, means for actuating said driven shaft, means for rotating said terminal sections operatively connected with the driven shaft and the terminal sections and means for moving said last named means out of operative engagement with the driven shaft and for permitting the center section to rotate operated automatically when the weight of the grain in the receiving sack reaches a predetermined point.

16. An automatic weighing and sacking machine including a supporting frame, a discharge rotor journaled in said frame, a plurality of sack holders, a plurality of sacks for said sack holders adapted to receive the material from said discharge rotor, said rotor including a driven shaft, a central rotor section keyed upon said shaft, a pair of cylindrical sleeves loosely mounted upon said shaft, terminal rotor sections keyed upon said sleeve and normally operatively connected with said driven shaft and means for automatically permitting the rotation of the center sections relative to the terminal sections when the material in the receiving sack reaches a predetermined weight.

In testimony whereof I affix my signature in presence of two witnesses.

CLARENCE P. BRUMBY.

Witnesses:
B. B. BAKER,
A. J. McCOY.